Patented June 14, 1938

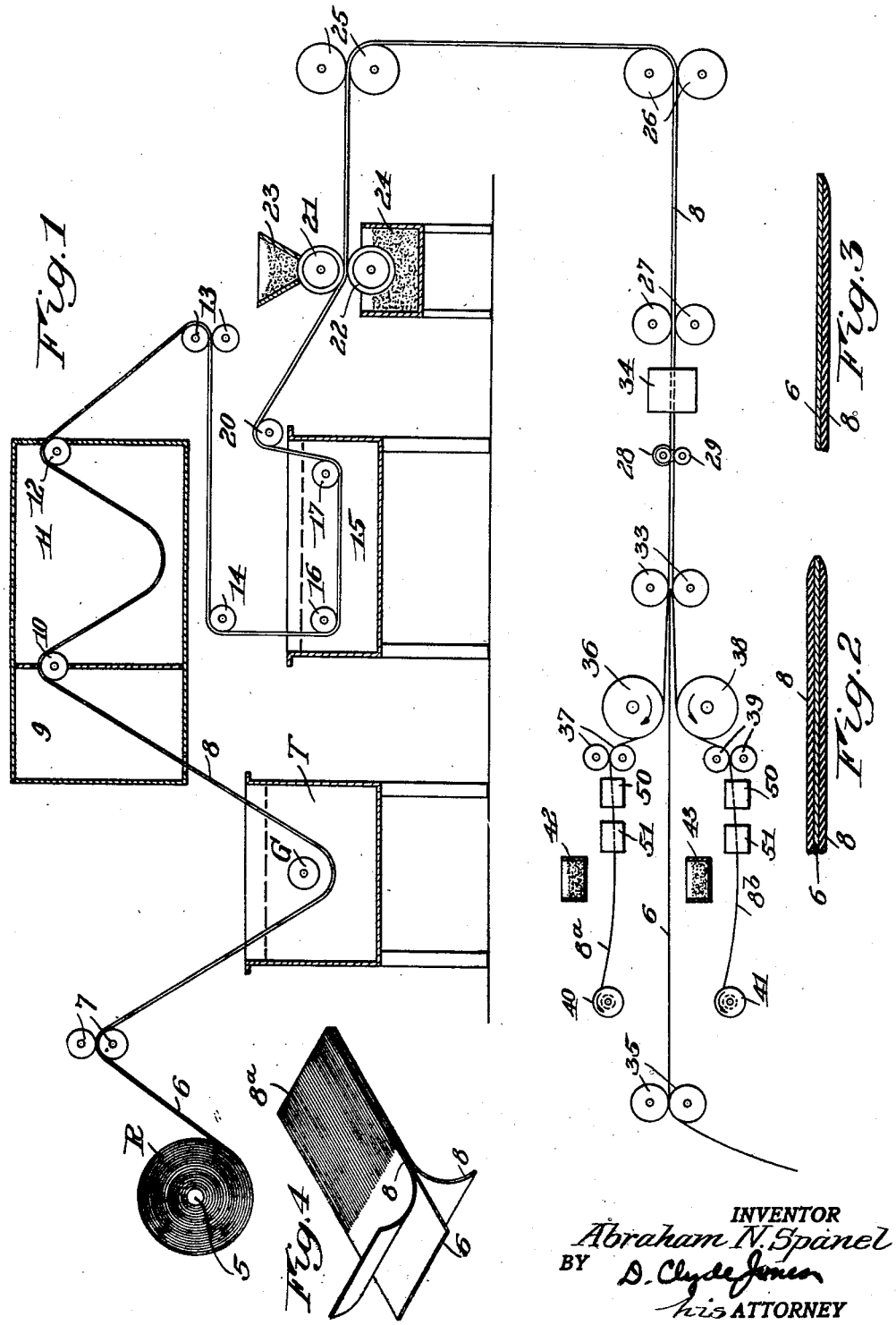

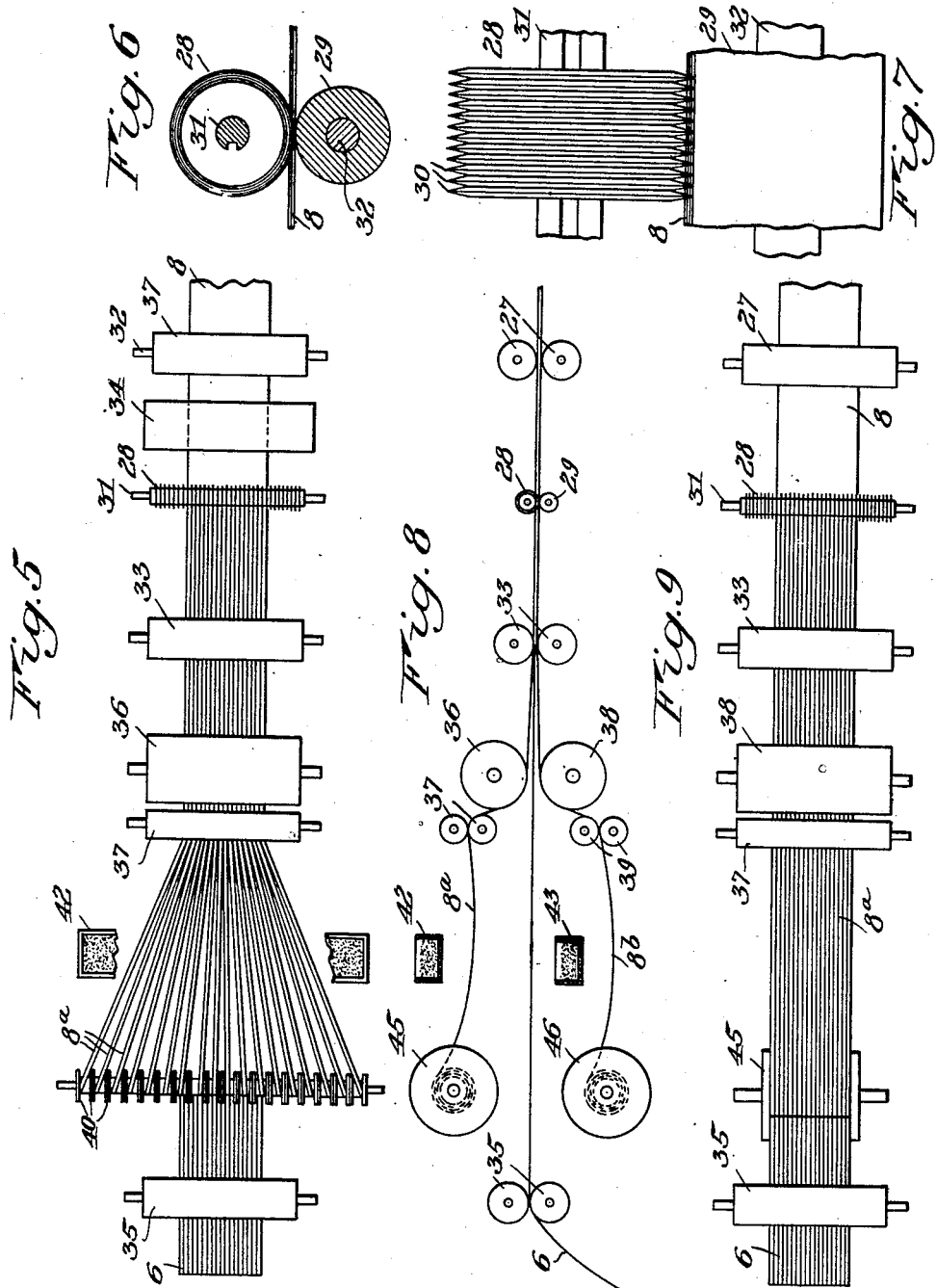

2,120,721

UNITED STATES PATENT OFFICE 2,120,721

METHOD OF AND APPARATUS FOR MAKING RUBBER THREAD

Abraham N. Spánel, Rochester, N. Y.

Application August 27, 1935, Serial No. 38,083

10 Claims. (Cl. 18—54)

This invention relates to the method of and to apparatus for making rubber thread.

The present invention has for its purpose the rapid, economical production of rubber thread of uniformly excellent quality and of any desired width or thickness.

The various features and advantages of the invention will appear from the detailed description and claims when taken with the drawings in which Fig. 1 diagrammatically illustrates apparatus for making simultaneously a plurality of rubber strands or rubber threads of relatively great length; Fig. 2 is a side elevation somewhat enlarged of a sheet of material coated on both of its sides, ready to be slit into threads; Fig. 3 is a similar side elevation of a sheet of material coated on one side with a layer of rubber ready to be slit into threads; Fig. 4 is a fragment of a sheet coated with rubber on both of its sides and with a portion thereof slit into a plurality of strands, the end margins of the rubber layers which are illustrated separated from the supporting strip, being uncut; Fig. 5 is a diagrammatic plan view illustrating that portion of the apparatus of Fig. 1 which is utilized in the operations of slitting the rubber layers and their supporting sheet, the separation of the resulting strands from the strands of the sheet and the winding of the rubber threads on a plurality of spools; Figs. 6 and 7 are respectively a side elevation and a front elevation of the slitting or cutting knives showing their relation to a supporting roll, during the operation of slitting the sheet and the layers thereon; Figs. 8 and 9 are respectively a side elevation and a plan view of a diagrammatic showing of a modified arrangement for winding the resulting strands of a layer on a single spool.

Referring especially to Fig. 1, R designates a roll of substantially impervious sheet material such as, foil backed by paper, paper or metal foil preferably aluminum foil, mounted for rotation on a support 5 so that the sheet of foil 6 can be unwound therefrom. A pair of feed rolls 7 which are preferably driven at a constant speed by any suitable means (not shown), unwinds the foil from the roll R and feeds it at a uniform rate of speed into an open-topped receptacle T containing a bath of liquid latex such as an aqueous dispersion of rubber. The sides of this receptacle, support a guide G preferably in the form of a roller under which the moving sheet of foil 6 passes. It will be understood that as the strip of foil passes through and emerges from the latex bath, it is coated on each of its surfaces with a layer of rubber. After being thus coated the advancing foil, now designated 8, passes through a drying oven 9 wherein the rubber layers on the sheet are dried. From the drying oven the coated foil 8 with the layers thereon thus dried, passes over the roll 10 preferably driven at the same peripheral speed as the feed rolls 7, into a curing oven 11 wherein the layers of rubber on the foil are dried or partially cured, or entirely vulcanized. A rotating roll 12, having the same peripheral speed as the feed rolls 7 and the guide roll 10, guides the coated foil 8 to a pair of rotating feed rolls 13 also driven at the same peripheral speed as the previously mentioned rolls. These feed rolls advance the coated foil 8 which thereafter passes around the guide roll 14, into a tank 15 of hot water wherein further vulcanization or curing of the rubber may be completed. Suitable guide rolls 16 and 17, mounted in the tank, guide the coated foil at a uniform speed through the hot water from which the foil advances over the guide roll 20 and between a pair of felt rolls 21 and 22 which are preferably driven in any suitable manner. These felt rolls serve not only to advance the coated sheet 8, but also to apply to its exposed surfaces dusting powder such as ground talcum or soap stone from receptacles 23 and 24, which continuously apply a small amount of powder respectively to the surfaces of the felt rolls 21 and 22.

It should be understood that the rubber layers on the coated foil 8 are dried or partially cured, or entirely vulcanized in the curing oven by subjecting them to hot air or gas at a temperature of between 195° F. and 240° F. for a period of fifteen minutes duration so that the rubber is not rendered "harsh". Thereafter, these layers may be subjected to hot water preferably boiling water for a period of time sufficient to further complete the curing or vulcanization. By this combined use, first of hot air or gas and then by hot or boiling water, a cured rubber layer is obtained which has none of the "harshness" of rubber cured in hot air alone and has none of the "mushiness" of rubber cured in hot water only. Instead the resulting rubber has a velvety feel and also wears and ages well.

Since the coated sheet or foil 8 is now dried or cured, it can be rewound into rolls and stored until such time as it is to be cut or slit into threads, but if preferred to make the operations continuous, the foil 8 is immediately cut into threads. This is effected by passing the foil 8 between the guide rolls 25 and 26 and thence between the feed rolls 27. From these feed rolls the foil passes between the slitting roll 28, and the backing roll 29. As best illustrated in Figs. 6 and 7, the slitting roll 28 includes a plurality of disk knives 30 secured to a driven shaft 31, the distance between the edges of adjacent blades determining the width of the resulting threads. The edges of the knives of the slitting roll engage the surface of the backing roll 29 carried by the driver shaft 32, the surface of the backing roll being covered with a material which will not dull the edges of the knives and yet will firmly hold the coated sheet against the knives. This covering may be made of rubber having the proper degree of resiliency. The coated foil 8 after leaving the slitting roll passes between the driven rolls 33 which are preferably driven at such speed with respect to the feed rolls 27, that the coated foil is held taut during the slitting operation. As herein illustrated, the rubber on the sheet is rendered somewhat rigid prior to the slitting operation by subjecting it to a refrigerating atmosphere. To effect this result, the sheet passes through a chamber 34 containing a refrigerating medium such as solid carbon dioxide. However, the invention is not limited to the refrigerating of the coated sheet prior to slitting. After the slitting operation it is necessary to separate the rubber strands from the strands of the supporting sheet or foil. In order to effect this result, the strands of the aluminum foil are fed between the pair of feed rolls 35 for discharge into a scrap receptacle (not shown). The rubber strands or thread 8a formed by slitting the upper rubber layer engage the periphery of a large roller 36 and thereafter pass between the feed rolls 37. The roller 36 and the feed rolls 37 are preferably driven at a somewhat faster rate than the feed rolls 33 so that the strands of rubber thread are stretched whereas the strands of aluminum foil remain unstretched, so that the rubber threads are separated from the strands of the foil. Similarly, the strands or threads 8b formed by cutting the lower layer of rubber pass about the periphery of a large roller 38 and between a pair of feed rollers 39 which function in the same manner as the roller 36 and the feed rolls 37 to separate the rubber strands into which the lower layer has been cut, from the strands of foil. From the feed rolls 37 each of the upper rubber threads is wound on an individual, spool 40, which spools are preferably driven at the same rate of speed as the feed rolls 37 so that the threads are not under tension while they are being wound. Similarly, the strands formed from the lower layer are wound on individual spools 41 likewise driven at the same rate of speed as the feed rolls 39. As herein illustrated, dusting boxes 42 and 43 with perforated bottoms serve to apply dusting powder such as talcum or soap stone to the several strands prior to their being wound on the several spools.

In certain instances fragments of the aluminum foil or other material comprising the supporting strip may adhere to the rubber threads 8a and 8b after they have passed between their respective feed rolls 37 and 39. These fragments may be removed by passing the threads through a bath 50 of hydrochloric acid or sulphuric acid until the fragments disintegrate. Thereafter, the threads are dipped into a bath 51 of ammonium hydroxide or the like to neutralize the acid adhering to the threads after they leave the bath 50. The threads are then dried, dusted and wound on spools as previously described.

One or both ends of the coated sheet or strip of foil may be left unslitted so that a margin of sufficient width for convenient handling is provided thereby holding the individual rubber strands in their initial relative position without tangling. In order that the end margins of the coated foil may be left uncut, the slitting roll 28 may be temporarily raised from the backing roll 29 when the end margin of the foil is passing thereunder. It will be understood that when the threads 8a and 8b are initially fastened for winding on their individual spools, each thread may be torn or cut from the uncut margin just prior to its being fastened on its spool. In this manner, the individual threads are maintained in proper relation without danger of tangling.

The modified form of the invention shown in Figs. 8 and 9 differs from that just described in that the threads 8a are wound all together on a single spool 45 while the threads 8b are wound all together on the single spool 46. It will be appreciated that when all the threads of a layer are thus wound on a single spool, the unslitted end margins of the rubber layer will maintain the threads in their proper relation without danger of tangling.

Although the sheet of foil has been illustrated as coated with rubber on both surfaces thereof, one of its surfaces alone can be coated by maintaining the bath at a proper level in the receptacle T so that only the lower surface of the foil contacts the latex.

If it is desired to produce threads of greater thickness than can be obtained conveniently from a single dip, the coated foil 8 can be passed through a second latex bath contained in a second receptacle such as T. The foil 8 with this added coating is then treated in the manner above described.

While the rubber layers are herein illustrated as being vulcanized prior to slitting, they may be slitted after the drying operation either before or after vulcanization. It will also be understood that the foil or paper base supporting the rubber layer, may first be subjected to a coagulating medium such as acetic acid.

This application discloses subject matter, in part common with that disclosed in applicant's copending application, Serial No. 752,999, filed November 14, 1934.

What I claim is:

1. The method of making rubber thread and the like, which comprises applying a layer of liquid rubber on a strip of sheet material, drying the rubber layer on the strip, moving said coated strip, slitting the strip and the rubber layer thereon lengthwise into a plurality of strands while the strip is moving, and removing the resulting strands of rubber from the resulting strands of material.

2. The method of making rubber thread and the like, which comprises applying a layer of liquid rubber on both surfaces of a continuously moving strip of sheet material, drying the rubber layers on the strip, slitting the strip and the rubber layer thereon lengthwise into a plurality of strands while the strip is moving, and removing the resulting strands of rubber from the resulting strands of material.

3. The method of making rubber thread or the like, which comprises applying a coating of liquid rubber on a sheet of material, drying the rubber layer on the sheet, temporarily reducing the resilience of the rubber coating and immediately slitting the sheet and the rubber coating thereon into a plurality of strands, and removing the strands of rubber from the strands of material.

4. The method of making rubber thread or the like, which comprises applying a coating of liquid rubber on a sheet of material, drying the rubber layer on the sheet, chilling the rubber coating and slitting the sheet and the rubber coating thereon into a plurality of strands, and removing the strands of rubber from the strands of material.

5. The method of making rubber thread or the like, which comprises applying a layer of liquid rubber on a relatively long supporting band of sheet material, drying the rubber layer on the supporting band, slitting the supporting band and the rubber layers thereon with the exception of an end margin thereof into a plurality of strands, and removing the strands of rubber together with the unslitted end margin of the rubber layer from the strands of the supporting band and the unslitted end margin thereof.

6. The method of making rubber thread or the like, which comprises applying a layer of liquid rubber on a relatively long supporting band of sheet material, drying the rubber layer on the supporting band, slitting the supporting band and the rubber layer thereon with the exception of both end margins thereof into a plurality of strands, and removing the strands of rubber together with the unslitted end margins of the rubber layer from the strands of the supporting band and the unslitted end margins thereof.

7. The method of making rubber thread or the like, which comprises depositing a layer of liquid rubber on a sheet, drying the rubber layer thus deposited while on the sheet, slitting the sheet and the rubber thereon into a plurality of strands, and removing the strands of material from the strands of rubber by passing both sets of strands through a solution which disintegrates the sheet and relatively does not attack the rubber.

8. The method of making rubber thread and the like which comprises applying a layer of liquid rubber on a sheet of relatively inelastic material, drying the rubber layer on the sheet, slitting the sheet and the rubber layer thereon into a plurality of strands, stretching the strands of rubber without materially stretching the strands of the material, to remove the strands of rubber from the strands of material.

9. Apparatus for making rubber thread and the like, comprising means for applying a layer of liquid rubber on a strip of flimsy sheet material, means for drying the rubber layer on the strip, means for simultaneously slitting the strip and the rubber layer thereon lengthwise into a plurality of strands, and means for removing the resulting strands of rubber from the resulting strands of material.

10. Apparatus for making rubber thread and the like, comprising means for applying a coating of liquid rubber on both surfaces of a strip of sheet material, means for drying the rubber coatings on the sheet, means for simultaneously slitting the strip and the rubber coatings thereon into a plurality of strands, and means for removing the resulting strands of rubber from the resulting strands of material.

ABRAHAM N. SPÁNEL.

CERTIFICATE OF CORRECTION

Patent No. 2,120,721.  June 14, 1938.

ABRAHAM N. SPÁNEL.

It is hereby certified that error appears in the printed specification of the above numbered patent requiring correction as follows: Page 3, first column, line 14, claim 5, for the word "layers" read layer; and second column, line 15, beginning with "9. Apparatus" strike out all to and including the word and period "material." in line 32, constituting claims 9 and 10, and substitute instead the following claims:

9. Apparatus for making rubber thread and the like, comprising means for applying a layer of liquid rubber on a strip of flimsy sheet material, means for drying the rubber layer on the strip, means for moving the coated strip, means for simultaneously slitting the strip and the rubber layer thereon lengthwise into a plurality of strands while the strip is moving, and means for removing the resulting strands of rubber from the resulting strands of material.

10. Apparatus for making rubber thread and the like, comprising means for applying a coating of liquid rubber on both surfaces of a strip of flimsy sheet material, means for continuously moving said strip, means for drying the rubber coatings on the strip, means for simultaneously slitting the strip and the rubber coatings thereon into a plurality of strands while the strip is moving, and means for removing the resulting strands of rubber from the resulting strands of material.;

and that the said Letters Patent should be read with this correction therein that the same may conform to the record of the case in the Patent Office.

Signed and sealed this 26th day of July, A. D. 1938.

(Seal)

Henry Van Arsdale,
Acting Commissioner of Patents.